Figure 1:
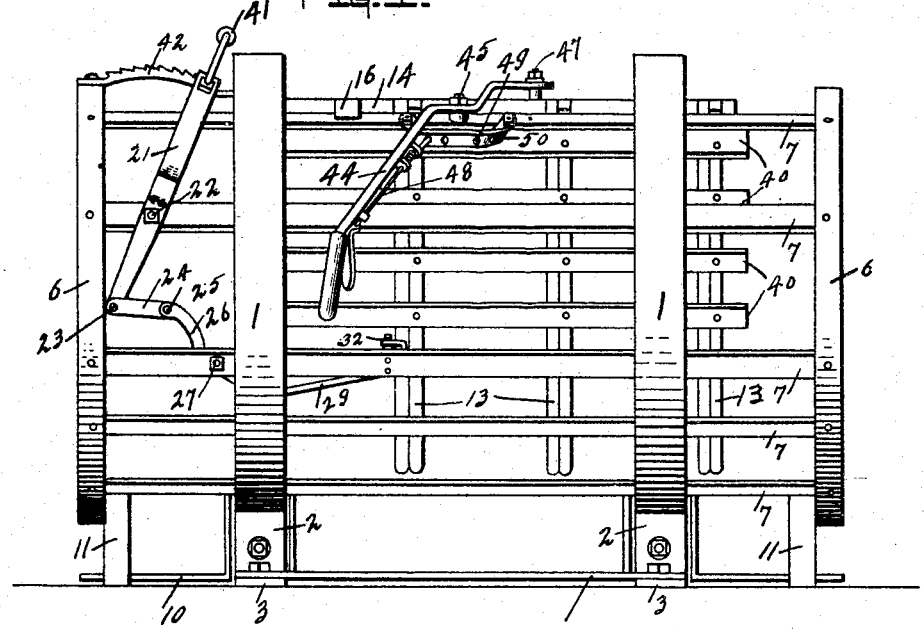

J. DOBRY.
HOG TRAP.
APPLICATION FILED SEPT. 28, 1908.

939,228.

Patented Nov. 9, 1909.
6 SHEETS—SHEET 1.

Witnesses:
H. V. Gilson
Laura E. Claypool

Inventor
John Dobry
By Chas. W. LaPorte
Atty.

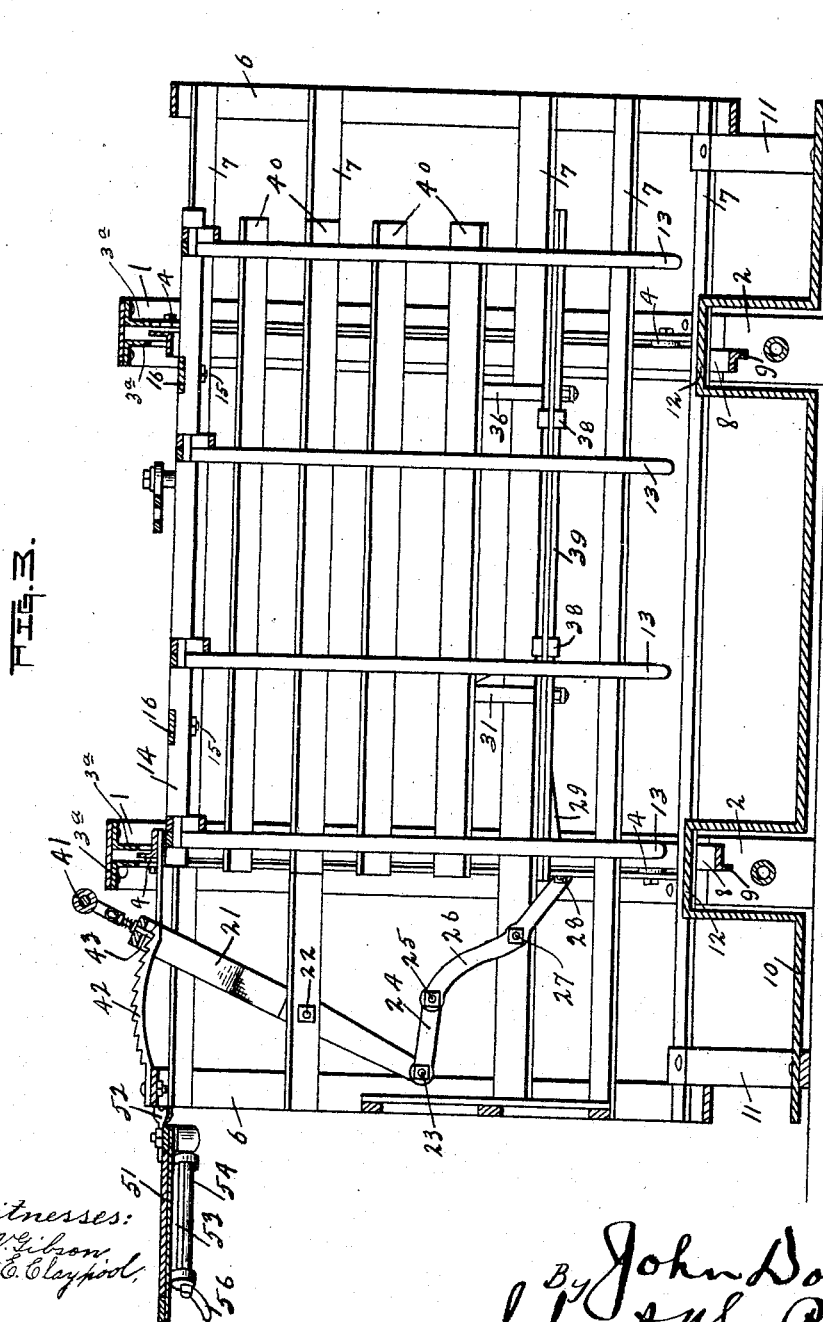

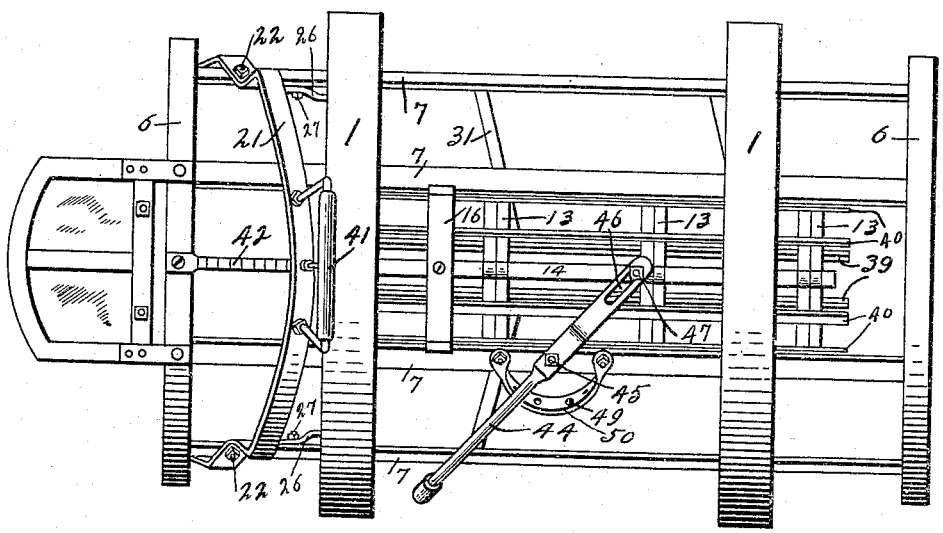
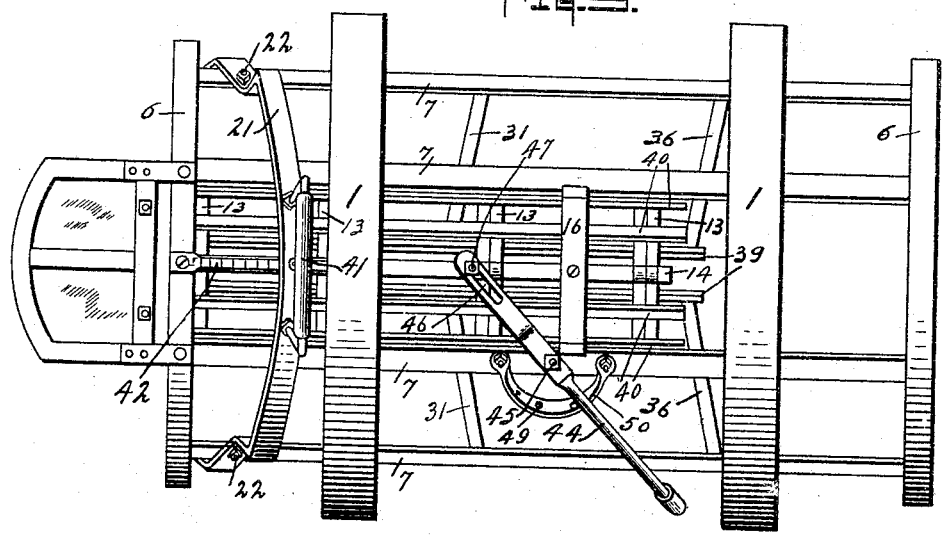

J. DOBRY.
HOG TRAP.
APPLICATION FILED SEPT. 28, 1908.
939,228.
Patented Nov. 9, 1909.
6 SHEETS—SHEET 4.
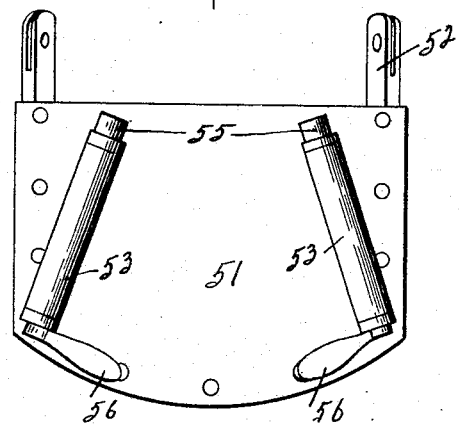
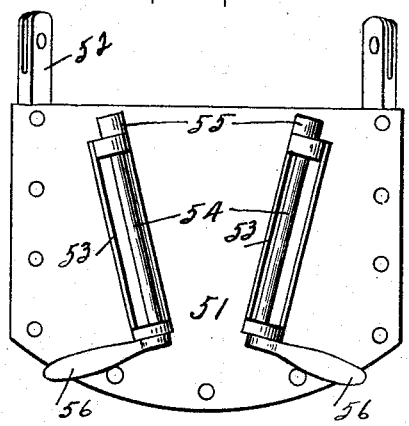
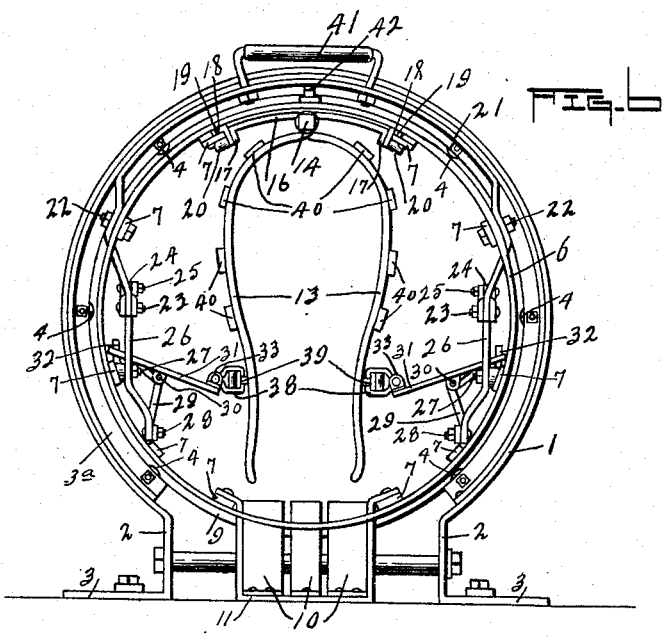
Witnesses:
H. V. Gibson
Laura E. Claypool
Inventor
By John Dobry
Chas. M. La Porte
Atty.

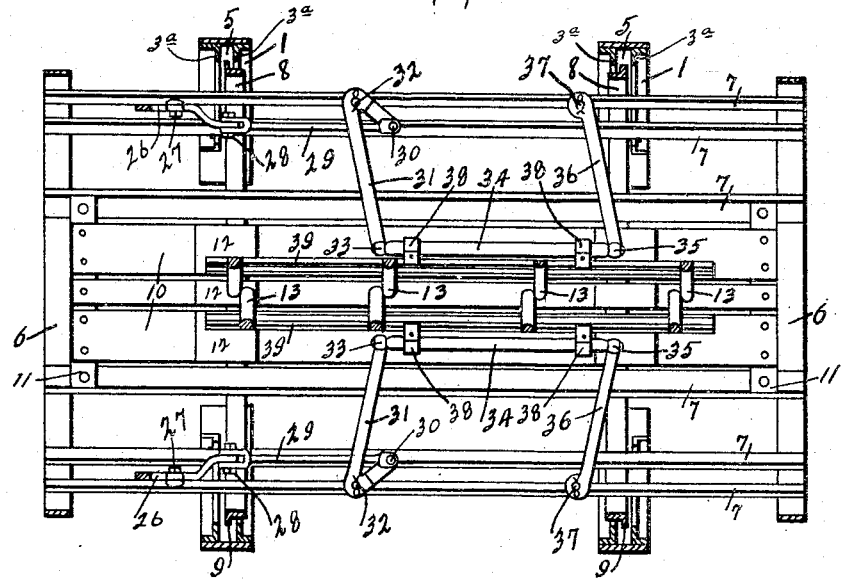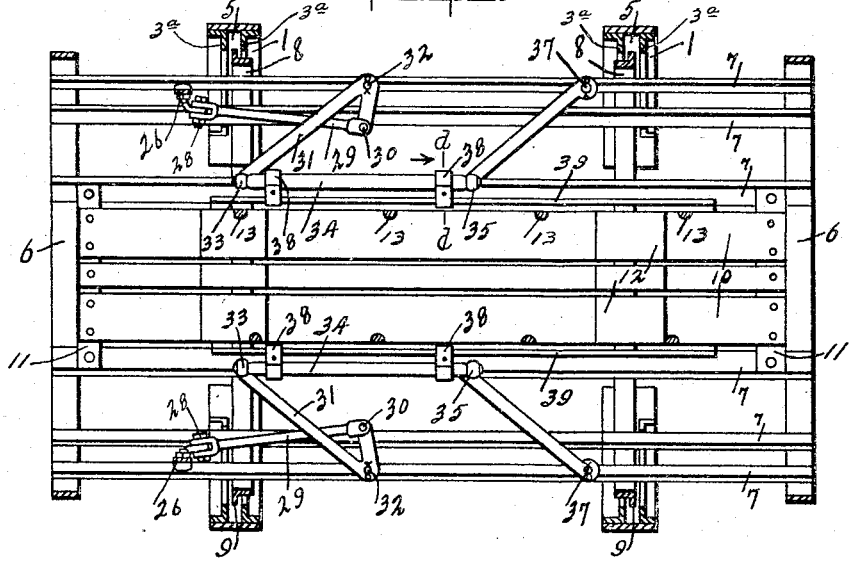

J. DOBRY.
HOG TRAP.
APPLICATION FILED SEPT. 28, 1908.
939,228.
Patented Nov. 9, 1909.
6 SHEETS—SHEET 6.
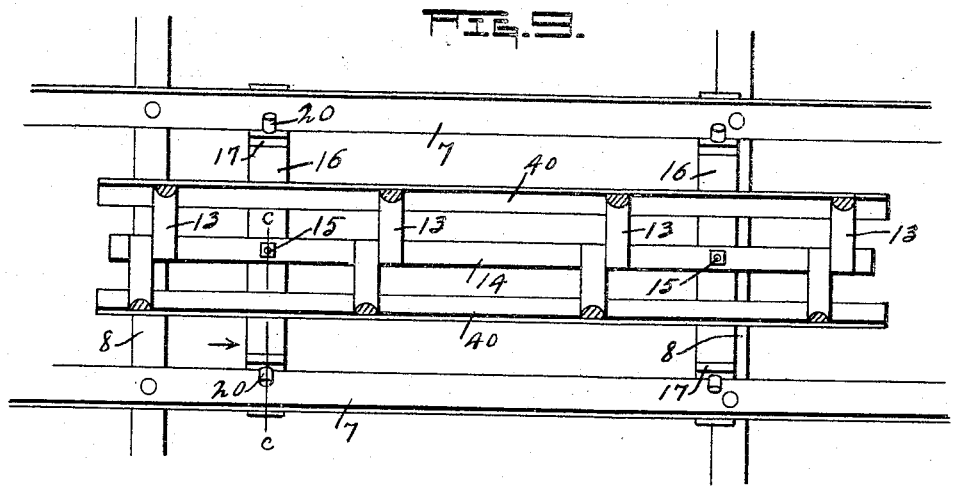
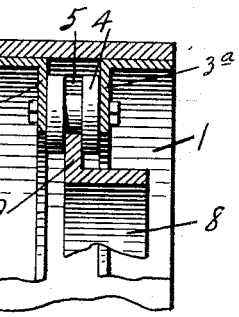
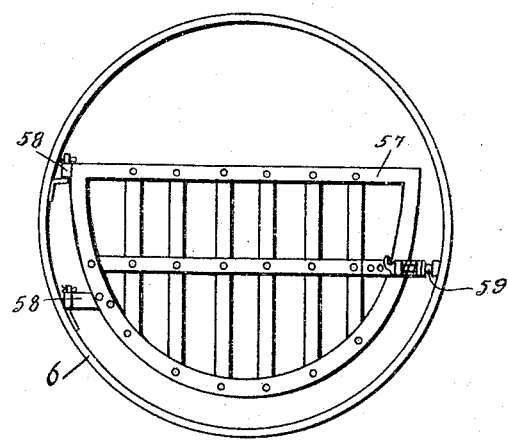
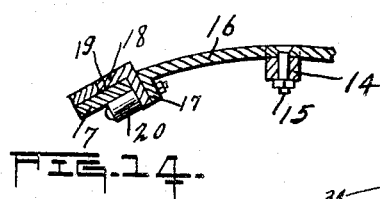
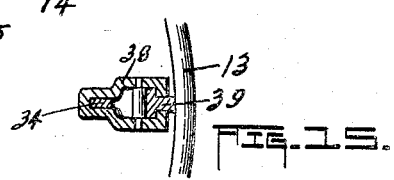

UNITED STATES PATENT OFFICE.

JOHN DOBRY, OF ST. PAUL, NEBRASKA.

HOG-TRAP.

939,228.  Specification of Letters Patent.  Patented Nov. 9, 1909.

Application filed September 28, 1908.  Serial No. 455,122.

*To all whom it may concern:*

Be it known that I, JOHN DOBRY, a citizen of the United States, residing at St. Paul, in the county of Howard and State of Nebraska, have invented certain new and useful Improvements in Hog-Traps; and I do hereby declare that the following is a full, clear, and exact description of the invention, which will enable others skilled in the art to which it appertains to make and use the same.

This invention has reference to a hog trap, or to a machine which is adapted to receive a hog or a similar animal, which it is intended will walk into the same, and after the said animal has entered the machine, devices therein will be so manipulated for preventing the animal from extricating itself therefrom, and said invention has for its object to place the animal in such a position that it may be treated for certain diseases, or for the purpose of performing a surgical operation on the animal, or for putting a ring into the snout of the animal.

The invention has for its further object to provide a machine to receive a hog or similar animal which it is intended to treat in the manner stated, as aforesaid, and is of such a construction as will receive the animal and prevent it from extricating itself therefrom, and includes a revoluble member in which the animal is retained, for turning the animal into a position so that it will be up side down, and also includes means for moving the animal lengthwise to place it in a position to be treated.

A further object of the invention is to construct a machine capable of receiving a hog or similar animal that it may be subjected to treatment as aforesaid, which said machine includes in its structure, a frame, a revoluble drum supported in the frame and pivotally supported engaging arms slidably supported in said revoluble drum; the pivotally and slidably supported arms capable of being opened to allow a hog or similar animal to enter therebetween, when the same may be closed for retaining such animal in the revoluble drum, when the drum may be rotated for placing the animal in a position with its snout uppermost, and the pivotally and slidably supported arms moved endwise for the purpose of placing the head of the animal in position to receive treatment.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 2:
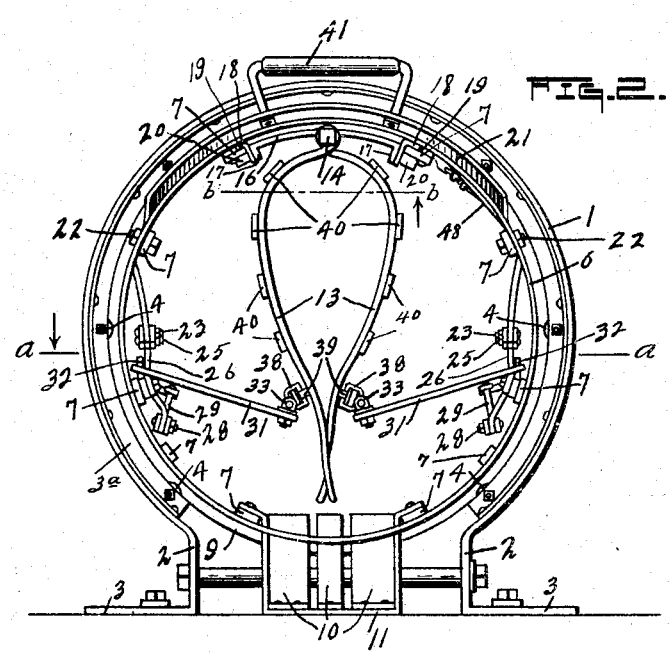

Figure 1 is a side elevation of my improved machine; Fig. 2 is an elevation looking at one end thereof, with the rest or table for the head of the animal removed; Fig. 3 is a vertical longitudinal section through the machine; Fig. 4 is a plan view of the machine, with the animal retaining means retracted; Fig. 5 is a view similar to Fig. 4, but with the animal retaining means shown extended or moved lengthwise to one end of the machine; Fig. 6 is a view similar to Fig. 2, except that the means within the drum for securing the animal therein, is shown open to receive the animal; Fig. 7 is a longitudinal cross section in plan, as the same would appear if taken on the line *a—a* of Fig. 2, showing the position of certain parts when the animal retaining means are in a closed position; Fig. 8 is a view similar to Fig. 7, except that the parts are shown opened; Fig. 9 is a cross section in plan as the same would appear if taken on the line *b—b* of Fig. 2, and looking in the direction of the arrow in said figure; Fig. 10 is a detached view in plan of a head rest or table, upon which it is designed to lock the head of the animal, with the parts thereon shown in an inoperative position; Fig. 11 is a view similar to Fig. 10, with the parts thereon shown in an operative position, or that position in which the parts would be when securing the head of an animal on the head rest or table; Fig. 12 is an enlarged sectional detail, showing the roller bearings for the head of the revoluble frame in the support; Fig. 13 is an end elevation in outline of the revoluble frame, showing how a door might be hinged thereto, for preventing the escape of the animal after it enters the revoluble frame; Fig. 14 is an enlarged sectional detail as the same would appear if taken on the line *c—c* of Fig. 9, and Fig. 15 is an enlarged sectional detail as the same would appear if taken on the line *d—d* of Fig. 8, looking in the direction of the arrow in said figure.

Like numerals of reference indicate corresponding parts throughout the figures.

The support of the machine comprises the frame parts 1, which are approximately circular in outline, terminating in the legs 2, which are bent at right angles at their lower ends, as at 3, to provide for bolting or otherwise firmly securing the machine to the floor or other base. The supports number two, and are braced at suitable distances apart, as shown in Fig. 1, and while I have only shown two of such supports, it is understood that the machine may be lengthened or shortened as may be desired, and other supports of the same character provided, if necessary. Although these supports are not shown braced from each other, except through connections which will be described between said supports, and a revolving frame or drum mounted to rotate therein, yet such other and rigid supports may be provided if it is thought necessary. Attached to the inner faces of the supports 1, are shown angle iron plates 3ª, which are suitably spaced apart, as shown in Figs. 3, 7 and 8, and particularly Fig. 12, so as to form a guide-way for portions of a revoluble frame, and to support friction rollers therebetween, which are engaged by said revoluble frame, and serve as a mounting for the revoluble frame or drum, which will facilitate in the easy rotation of said frame in the supports. The friction rollers are indicated as 4, and are suitably mounted between the angle iron plates 3ª, and said rollers are provided with the annular grooves 5, to receive portions of the revoluble frame, which will be described.

A revoluble frame or drum, to which reference has been made, comprises the annular bands 6, which are disposed at the opposite ends of the frame or drum, and are connected by the plurality of bars 7, which, together with said bands 6, constitute the body of the revoluble frame or drum. Encircling the bars 7, and secured thereto, are bands 8, having the flanges 9, which said bands are so located with respect to the supports 1, that they coincide with said supports, and the flanges 9 operate between the angle iron plates 3, and in the groove 5 of the friction rollers 4. The bands 8 may be of any suitable construction, although I prefer such as are provided with flanges, and a convenient way of constructing the same, is to provide the angle iron bands, as indicated.

It will be observed that the revolving frame or drum extends beyond the supports 1 on opposite sides, and that the mounting of the frame or drum in the supports, is such that an operator may take hold of the frame or drum at any suitable or convenient point and rotate the same in the supports, and although no means is shown for locking the position of the frame or drum, after being rotated or moved to a suitable point, yet it is understood that some suitable stop may be provided, although the frictional engagement between the bands 8 and the friction rollers 4, will have a tendency to retard the frame or drum against rotating, except when power is applied thereto in the manner in which I have stated.

The frame or drum is provided with a flooring, consisting of the bars 10, which extend the full length of the frame or drum, as shown in Figs. 1, 2 and 3, the outer ends of the bars being secured to U shaped straps 11, which are connected with a pair of bars 7, constituting the frame or drum, and where the bars 10 coincide with the bands 8 of the frame or drum, and the supports 1, the said bars are formed with the U shaped portions 12, best seen in Fig. 3, so as to pass through the bands 8, to allow for the rotation of the flooring, composed of the bars 10, when the frame or drum is rotated, as it will be noted that the flooring is mounted without the diameter of the frame or drum, for the following reasons: It is intended that the hog or other animal to be secured or retained within the machine, will enter the frame or drum from the right hand end thereof, looking at Figs. 1 and 3, and it is desirable that the flooring of the frame or drum be in a position, so that the body of the animal may be engaged by means in the drum, which will be described, and such flooring must be of such a construction that the animal can advance to the center of the drum. With the construction shown, the animal will, when entering the frame or drum, step over the bands 6, and also the bands 8, at the right hand end of the machine, looking at Figs. 1 and 3, which will place it in the center of the machine in a position to be engaged by the means, which I will describe, which will securely retain the animal within the frame or drum and prevent its extricating itself therefrom, and with its head located toward the left hand end of the machine, looking at Figs. 1 and 3.

The means to which I have referred for engaging the body of the animal, for securely fastening the same within the frame or drum, comprises a plurality of curved arms 13, which are arranged in pairs and pivotally hung so that each pair of arms may be swung apart in opposite directions. These arms are best seen in Figs. 2, 3 and 6. In Fig. 2, the arms are in a closed position, the position which they would assume when moved to engage the body of the animal to securely fasten it to the machine, while in Fig. 6, said arms are in an open position, or that position which they would assume for the purpose of allowing the animal to enter the machine, preparatory to it being secured therein. These arms are preferably of that shape shown in Fig. 2, being wider apart nearest their hinged ends, while being brought closer together at their lower ends, which is such a shape as will enable them, when brought together, to engage the body of the animal. These arms 13, at their upper ends, are hinged to a longitudinal bar 14, substantially in the manner shown in Figs. 3 and 9, and the said bar 14 is fixedly secured as at 15, to a plurality of transverse bars 16, which said bars 16 are shown supported in the frame or drum, that they may be moved longitudinally of the machine, for a purpose to be described. The bars 16 at their outer ends, are bent down at right angles, as shown at 17, to provide a face for securing thereto, the angle iron strips 18, which are adapted to have movement longitudinally of a pair of the bars 7 of the frame or drum; said bars 7, with which the angle iron strips 18 have engagement, are constructed substantially as shown in Figs. 2 and 14, by being grooved out as at 19, to provide a way or track, along which portions of the angle iron strips 18, may move and to form a support or connection therefor. To the said angle iron strips 18, are also connected friction rollers 20, which have a bearing on the inner faces of the bars 7 having the grooves 19, and are adapted to travel along the said bars during the movement of the bars 16, when moving the arms 13 in and out, as will be described.

The mechanism for operating the arms 13 for the purpose of throwing them into the open position shown in Fig. 6, or into the closed position shown in Fig. 2, comprises the arched bar or what may be termed a lever 21, which extends part way around the frame or drum, and on opposite sides is pivotally connected at 22 with said bars 7 of the frame or drum. The lower opposite ends of the lever 21, are shown pivotally connected at 23, to the bars 24, which are in turn pivotally conected at 25, with levers 26, and said levers 26 are fulcrumed intermediate their ends, or at points 27, to certain bars 7 of the frame or drum, and at their inner ends, have pivotally connected thereto at 28, rods 29, and said rods extend inwardly into the frame or drum for a suitable distance, as best seen in Figs. 7 and 8, and at their inner ends have a pivotal connection at 30, with the short end of a lever 31, fulcrumed at 32 to certain of the bars 7 of said frame or drum, and the longer portions of said levers 31 extend approximately transverse of the frame or drum, and near to the center thereof, and have a swiveled connection at 33 with a longitudinally disposed bar 34, which said bars at their opposite ends have a swiveled connection at 35, with arms 36, which are similar to the longer portion of the lever 31, and at their outer ends are pivotally connected at 37, with certain of the bars 7, substantially in the same manner as the levers 31 are pivoted at 32. Connection is made between the longitudinally disposed bars 34, and the pivoted arms 13, by providing said arms with, or connecting thereto, brackets 38, which are connected in the manner shown in Figs. 2 and 15, with longitudinally disposed T shaped bars 39, which are connected or attached to a series of the pivoted arms 13, at or near their lower ends in the manner shown. By connecting the brackets 38 on the bar 34, with the T shaped bar 39, in the manner shown, it permits of the arms 13 being moved with the transverse bars 16 longitudinally of the frame or drum, without affecting the connection of the operating mechanism with the said pivoted arms 13, and no matter what position the said arms are in, whether retracted or moved to the opposite end of the machine, they may be operated to be opened or closed. I provide in connection with the arms 13, the longitudinally disposed bars 40, which connect the said arms 13 and form a frame work which is moved in unison when the pivoted arms are opened and closed for the purpose of receiving and securing an animal therein.

To the lever 21, is attached or secured a hand hold 41 to enable the operator to move the lever in opposite directions, and associated with said lever, is a rack 42, and the spring held detent or pawl 43, serving as a lock for the lever when thrown into different positions. For the purpose of moving the pivoted arms 13 apart, or into that position shown in Figs. 6 and 8, the operator, looking at Fig. 1, would grasp the hand hold 41 and throw the lever 21 to the left, which will operate the parts connected therewith, which I have just previously described, and such operation will swing the arms 13 into the position shown in Fig. 6, while a reverse operation of the lever, will return the parts to the position shown in Fig. 2.

In the manner in which the arms 13 are supported, and connected to the mechanism for opening and closing said arms, it will be observed that the arms may be moved from that position shown in Figs. 1, 3, 4 and 7, to that position shown in Figs. 5 and 8, and the mechanism for doing this, comprises a lever 44, which is fulcrumed at 45, to one of the bars 7 of the frame or drum, and at its inner end, said lever is shown slotted, as at 46, which has connection with, and in which operates a short stem 47, projecting up from the longitudinal bar 14, to which the arms 13 are pivotally connected. It will be observed that if the lever 44 is swung on its pivot 45 from that position shown in Fig. 4, to that position shown in Fig. 5, the bar 14 and with it, the transverse bars 16, will be moved from their inward or retracted position shown in Figs. 1, 3 and 4, to their outward or extended position, best seen in plan in Fig. 5, carrying with them, the pivoted arms 13, and the animal secured therebetween. It being understood, as previously described, that the bars 16 travel along the bars 7 of the frame or drum, with which they have connection, at the same time, the T shaped bars secured to the arms 13, and which have connection with the brackets 38 of the pivoted arm actuated mechanism, may move longitudinally in the brackets without affecting the position of said brackets, or the operation of the mechanism connected therewith, for opening or closing the arms 13. In Fig. 1, is shown means for locking the arms 13, and connections therewith, in a retracted or extended position, and such means comprises a detent rod 48, which is adapted to have engagement with perforations 49 in a strap 50, connected with one of the bars 7 of the frame or drum.

Assuming that the arms 13 are in their retracted or inward positions, and have been thrown open, in which position they are shown in Fig. 6, and an animal enters the frame or drum from the right hand end, looking at Fig. 1, as soon as it has entered far enough into the frame or drum, the operator will reverse the position of the arms 13 by throwing the lever 21 rearward or into its normal position, which will cause the arms 13 to assume that position shown in Fig. 2, engaging the animal about the body thereof, or in such a manner that it will be impossible for the animal to extricate itself from the machine. Immediately thereafter, the operator may grasp hold of the frame or drum, at any suitable point which he may desire, and rotate the said frame or drum in the support, which will cause the arms 13 to be turned up side down, opposite to the position shown in Fig. 2, which will place the animal in a position where it will be upon its back, and its snout turned upward.

I have provided a means for securely holding the head of the animal, which consists of a head rest or table, best seen in Figs. 3, 10 and 11. This head rest or table is indicated as 51, and is provided with rods 52, by means of which, the same may be secured to the band 6, at the left hand end of the machine, looking at Fig. 3. This head rest or table, has no function, except when the frame or drum has been rotated in the position opposite to that shown in Fig. 2, or inverted, as previously stated, when the animal will be moved longitudinally of the frame or drum, if it is not far enough forward in the machine, when its head will rest upon the head rest or table, and to lock its head firmly on said head rest or table with the snout of the animal projecting upward, I have provided a locking means consisting of the elongated semi-circular bands 53, which are connected to rods 54, and the inner ends of said rods are eccentrically connected in blocks 55, which are pivotally secured to said head rest or table 51, while to the outer ends of said rods 54, are connected the hand holds 56. In Fig. 10, the bands 53 are shown in an inoperative position, by being swung outwardly, with the smooth portion of the plates uppermost, leaving room for the placing of the animal's head on the head rest or table 51, between the bands 53, when the ears of the animal will be laid flat, and the bands 53 swung inwardly into the position shown in Fig. 11, and the hand holds 56 operated, for impinging with the ears of the animal and locking the same between the bands 53 and the upper face of the headrest or table 51, in which position a ring may be placed in the snout of the animal, or his mouth opened by suitable means, and the animal treated with medicine, or if desired, the animal may be operated upon in any manner or for any purpose for which it may be desired to operate upon the said animal.

It will be understood that with the provision of the mechanism for moving the arms 13, and bands connected therewith, from an inward to an outward position, that any adjustment may be made of the securing means which it is desirable to make, for the purpose of placing the animal in that position for firmly securing its head to the head rest or table in the manner which I have just described. That is to say, it will determine largely the position the animal is in, after it enters the machine, as to the movement necessary to be given for the purpose of advancing the animal to place its head in a position to be secured to the head rest or table 51, and this adjustment is secured in the manner in which I have described.

In Fig. 13, there is an end view of the frame or drum, in outline only, as viewed from the right hand end looking at Fig. 1, and in this end of the frame or drum, there is provided a swinging gate 57 hinged to the bands 6, as at 58, and provided with a latch in the form of a spring held detent 59 for locking the gate in the closed position shown. This gate is provided for closing the end of the frame or drum in which the animal first enters, and for preventing his withdrawing from the drum after he has once entered the same.

Having thus fully described my invention, what I claim and desire to secure by Letters Patent of the United States, is:—

1. In a machine of the class described, the combination of a support, comprising circular frame supporting members, an elongated circular frame revolubly mounted within said supporting members, and animal securing means mounted within said frame.

2. In a machine of the class described, the combination of a support, comprising circular frame supporting members, a circular frame revolubly mounted within said supporting members, animal securing means mounted within said circular frame, and mechanism for opening and closing said securing means.

3. In a machine of the class described, the combination of a support, a revoluble frame mounted in said support, animal securing means of separable parts pivotally and slidably supported in said frame, means for separating such parts, and means for moving said securing means lengthwise of the frame.

4. In a machine of the class described, the combination of a support, a revoluble frame mounted in said support, a plurality of arms pivotally mounted within the inclosure of said frame, certain of said arms movable outwardly in one direction, while certain other of said arms are movable outwardly in the opposite direction, and means projecting from without said frame for actuating said arms.

5. In a machine of the class described, the combination of a support, a frame revolubly mounted in said support, a plurality of oppositely movable arms pivotally supported in said frame, mechanism for operating said arms to open and close the same, means for moving the arms lengthwise of the frame, and a head rest secured to said frame.

6. In a machine of the class described, the combination of a support, a frame revolubly mounted in said support, a plurality of animal engaging arms pivotally mounted in said frame, means for opening and closing said arms, and means for moving said arms toward and from one end of said frame.

7. In a machine of the class described, the combination of a support, a frame rotatably mounted in said support, a plurality of animal engaging arms pivotally mounted in said frame, means for operating said arms to engage an animal which may enter therebetween, mechanism for moving said arms longitudinally of the frame, and means for locking said arms in adjusted position when moved longitudinally of the frame.

8. In a machine of the class described, the combination of a support, a frame rotatably mounted in said support, a plurality of animal engaging arms pivotally mounted in said frame, mechanism for operating said arms to engage an animal which may enter therebetween, means for locking the arms in adjusted positions, mechanism for moving the arms longitudinally of the frame, and means for locking said arms in adjusted positions when moved longitudinally of said frame.

9. In a machine of the class described, the combination of a support, a circular frame revolubly mounted in said support and open at both ends, a plurality of animal engaging arms in said frame, a slidably mounted support in said frame having connection with said arms, means for operating said arms to engage an animal, and means for moving said support having the arms connected thereto longitudinally of said frame.

10. In a machine of the class described, the combination of a support, a circular frame revolubly mounted in said support and open at both ends, a plurality of animal engaging arms in said frame, a slidably mounted support in said frame with which said arms have a pivotal connection, means for operating said arms to engage an animal, means for moving said slidably mounted support longitudinally of the frame, and means connected with one end of said frame to which the head of the animal may be secured.

11. In a machine of the class described, the combination of a support, animal engaging means mounted in said support, and capable of being inverted, means for operating said animal engaging means for securing an animal in said support, mechanism for moving said animal engaging means longitudinally of said support, a rest for the head of the animal when said animal engaging means has been inverted, and means associated with said rest, for securing the head of the animal thereto.

12. In an apparatus of the character described, the combination of a circular frame supported for rotation, animal securing means pivotally mounted in said frame, means for moving said animal securing means lengthwise of the frame, means for operating said securing means to secure or release an animal, a head rest projecting longitudinally from said frame, and head securing means on said rest.

13. In an apparatus of the character described, the combination of an elongated circular frame supported for rotation, animal securing means pivotally mounted in said frame, a lever and connections between the lever and frame for moving said securing means lengthwise of the frame, means operated from one end of said frame for opening or closing said securing means, a head rest projecting longitudinally from that end of the frame from which the securing means is operated, and head securing means on said rest.

14. In an apparatus of the character described, the combination of a rotatable frame consisting of annular members and longitudinal connecting members, a support and guide for said frame, animal securing means in said frame, and means for operating said securing means.

15. In an apparatus of the character described, the combination of a rotatable frame consisting of annular members and longitudinal connecting members, a support and guide for said frame, animal securing means in said frame, mechanism for moving said securing means lengthwise of the frame, and means for operating said securing means to open and close the same.

16. In an apparatus of the character described, the combination of a rotatable frame consisting of annular members, and longitudinal connecting members, a support and guide for said frame, animal securing means in said frame, composed of pivotally mounted members adapted to be moved toward and from each other, means for moving said securing means lengthwise of the frame, and means for opening and closing said securing means.

17. In an apparatus of the character described, the combination of a rotatable frame consisting of annular members and longitudinal connecting members, a support and guide for said frame, animal securing means in said frame, mechanism for moving said securing means lengthwise of the frame, means for causing said securing means to engage or release an animal, and a head rest projecting longitudinally from said frame.

18. In an apparatus of the character described, the combination of a rotatable frame consisting of annular members and longitudinal connecting members, a support for said frame, roller guides for said frame mounted on said supports, animal securing means mounted in said frame, and means for operating said securing means.

19. In an apparatus of the character described, the combination of a rotatable frame consisting of annular members and longitudinal connecting members, a support for said frame, roller guides for said frame mounted on said supports, animal securing means mounted in said frame, means for operating said securing means, a head rest on said frame, and head securing means on said rest.

20. In an apparatus of the character described, the combination of a rotatable frame consisting of annular members and longitudinal connecting members, a support for said frame, roller guides for said frame mounted on said supports, animal securing means pivotally and slidably mounted in said frame, means for moving said securing means lengthwise of the frame, means for opening and closing said securing means, and head securing means on one end of said frame.

21. In an apparatus of the character described, the combination of a rotatable frame consisting of annular members and longitudinal connecting members, a support for said frame, roller guides for said frame mounted on said supports, animal securing means pivotally and slidably mounted in said frame, lever operating means for moving said securing means lengthwise of the frame, lever operating means for opening and closing said securing means, a head rest on one end of said frame, and head securing means on said rest.

22. In an apparatus of the character described, the combination of a rotatable frame, a support for said frame, roller guides for said frame mounted on said support, animal securing means pivotally and slidably mounted in said frame, means for moving said securing means lengthwise of the frame, means for opening and closing said securing means, a gate for one end of said frame, a head rest attached to one end of said frame, and manually operated head securing means on said rest.

23. In an apparatus of the character described, the combination of a rotatable frame, a support for said frame, animal securing means pivotally and slidably mounted in said frame, a lever mounted on said frame and capable of being rotated therewith, connections between said lever and said securing means, whereby when said lever is operated the securing means will be moved lengthwise of the frame, a second lever also mounted on said frame and capable of being rotated therewith, and connections between said second lever and said securing means, whereby when said second lever is operated, the securing means will be opened or closed.

24. In an apparatus of the character described, the combination of a rotatable frame, a support for said frame, animal securing means pivotally and slidably supported in said frame, means rotatable with the frame for moving the securing means lengthwise of the frame, means for locking the securing means in adjusted position when moved lengthwise of the frame, and means rotatable with the frame for opening and closing the said securing means.

25. In an apparatus of the character described, the combination of a rotatable frame, a support for said frame, animal securing means pivotally and slidably supported in said frame, means rotatable with the frame for moving the securing means lengthwise of the frame, means for locking the securing means in adjusted position when moved lengthwise of the frame, means rotatable with the frame for opening and closing the said securing means, a head rest secured to and rotatable with said frame, and head securing means on said rest.

26. In an apparatus of the character described, the combination of a support, a frame rotatably mounted in said support, friction rollers mounted on said support and engaged by portions of said revoluble frame, animal securing means operatively mounted in said frame, and means carried by said frame for operating said securing means.

27. In an apparatus of the character described, the combination of a support comprising a plurality of circular members and connections therebetween, a frame rotatably mounted in said support, friction guide rollers mounted on said circular members, means secured to said frame and having a rolling contact with said rollers, animal securing means in said frame, and mechanism mounted on said frame and operatively connected with said securing means for actuating the same.

28. In an apparatus of the character described, the combination of a rotatable frame, a head rest secured to said frame, and eccentrically arranged head securing means operatively supported on said rest.

29. In an apparatus of the character described, the combination of a frame, animal securing means mounted in said frame, means for operating said securing means, a head rest attached to said frame, and eccentrically arranged head securing means operatively supported on said rest.

30. In an apparatus of the character described, the combination of a frame, a head rest attached to said frame, a head securing means pivotally attached to said rest and also arranged to be partially rotated when swung into different positions.

31. In an apparatus of the character described, the combination of a frame, a head rest attached to said frame, a plurality of blocks pivotally connected with said rest, rods eccentrically connected with said blocks, and head engaging members secured to said rods.

In testimony whereof I affix my signature, in presence of two witnesses.

JOHN DOBRY.

Witnesses:
  Chas. W. La Porte,
  Laura E. Claypool.